(12) United States Patent
de Sylva

(10) Patent No.: US 7,743,980 B2
(45) Date of Patent: Jun. 29, 2010

(54) SYSTEM AND METHOD FOR FACILITATING MONETARY TRANSACTIONS

(76) Inventor: Robert Francis de Sylva, 161 Ocean Park Blvd. #D, Santa Monica, CA (US) 90405

(\*) Notice: Subject to any disclaimer, the term of this patent is extended or adjusted under 35 U.S.C. 154(b) by 211 days.

(21) Appl. No.: 10/712,206

(22) Filed: Nov. 12, 2003

(65) Prior Publication Data

US 2005/0098621 A1 May 12, 2005

(51) Int. Cl.
*G06K 5/00* (2006.01)

(52) U.S. Cl. .................. 235/380; 235/379; 235/492

(58) Field of Classification Search .......... 235/383, 235/462.1, 379, 382, 380, 492, 451, 385; 705/6, 39, 40
See application file for complete search history.

(56) References Cited

U.S. PATENT DOCUMENTS

| | | | |
|---|---|---|---|
| 5,239,167 A * | 8/1993 | Kipp ..................... | 235/383 |
| 5,613,012 A | 3/1997 | Hoffman et al. | |
| 5,764,789 A | 6/1998 | Pare, Jr. et al. | |
| 5,838,812 A | 11/1998 | Pare, Jr. et al. | |
| 6,192,142 B1 | 2/2001 | Pare, Jr. et al. | |
| 6,230,148 B1 | 5/2001 | Pare, Jr. et al. | |
| 6,269,348 B1 | 7/2001 | Pare, Jr. et al. | |
| 6,581,042 B2 | 6/2003 | Pare, Jr. et al. | |
| 2002/0147600 A1 * | 10/2002 | Waters et al. .............. | 705/1 |
| 2002/0169673 A1 * | 11/2002 | Prorock et al. ............ | 705/16 |
| 2003/0149661 A1 * | 8/2003 | Mitchell et al. ........... | 705/39 |
| 2004/0117302 A1 * | 6/2004 | Weichert et al. .......... | 705/40 |

\* cited by examiner

*Primary Examiner*—Seung H Lee

(57) ABSTRACT

A system for facilitating transactions. In an example embodiment, the system includes a charging terminal capable of charging an account based on an account number. A scanner obtains biometric information. A first mechanism employs the biometric information to automatically provide an account number to the charging terminal. In a specific embodiment, the first mechanism includes a credit card or Automated Teller Machine terminal (ATM), and the account number includes a credit number or ATM number. The first mechanism automatically selects from among plural accounts based on the biometric information. A second mechanism enables a user to control which account number is selected via the biometric information. A third mechanism enables the user to prioritize plural accounts. The highest priority account is selected for automatic charging via the system. In an illustrative embodiment, a seventh mechanism automatically provides transaction information to the charging terminal. The seventh mechanism wirelessly interrogates product tags associated with products to be purchased and computes a total in response thereto and forwards the total to the charging terminal.

31 Claims, 3 Drawing Sheets

SYSTEM AND METHOD FOR FACILITATING MONETARY TRANSACTIONS

BACKGROUND OF THE INVENTION

1. Field of Invention

This invention relates to transactions. Specifically, the present invention relates to systems and methods for facilitating purchases or other monetary transactions.

2. Description of the Related Art

Systems for facilitating purchases are employed in various demanding applications including credit card, Automated Teller Machine (ATM), checking account, and brokerage account transactions. Such applications demand efficient and secure systems to facilitate the transactions.

Conventionally, devices such as checks, credit cards, check cards, and ATM cards facilitate monetary transactions. Unfortunately, such devices, called tokens, are susceptible to loss or theft. As identity theft increases, lost or stolen tokens become increasingly problematic.

The proliferation of identity theft and credit card fraud has helped spawn increasingly complicated and expensive smart cards. Smart cards often incorporate additional authentication mechanisms to thwart fraud. Unfortunately, smart cards, which may contain additional user information, such as medical records and user photos, may actually increase user vulnerability to fraud and identity theft, since a successful thief may have access to more information. Furthermore, as users increasingly rely on additional functionality afforded by smart cards, such as accommodating electronic cash, users may be more inconvenienced when the cards are lost or stolen.

Systems and methods for implementing tokenless transactions address some problems associated with token use. An exemplary system is disclosed in U.S. Pat. No. 6,581,042, by Pare, Jr., et al., entitled TOKENLESS BIOMETRIC ELECTRONIC CHECK TRANSACTIONS. Generally, the system employs an identification apparatus that accepts biometric input from a user. A data processing center, which is part of a third party identicator, then identifies the user and facilitates selecting a checking account associated with the user based on the biometric input. A user then inputs a transaction amount, which is employed by the data processing center to initiate an electronic checking transaction via an automated clearing house to pay the transaction amount.

Unfortunately, the system has various shortcomings. The system is optimized for use with a single registered checking account and does not address credit card or other transaction types. Furthermore, both the payee (seller) and payor (buyer) are authenticated by a third party identicator. Accordingly, the seller must register with the identicator by providing information, such as hardware identification codes, phone numbers, email addresses, payee financial accounts, and so on. Furthermore, the seller must obtain digital certificates or other authentication data for use with the system. This registration step and subsequent seller authentication steps are undesirably time consuming and cumbersome.

Furthermore, the above-referenced system apparently lacks efficient mechanisms to enable a user to alter data maintained by the third party identicator. Altering data maintained by the third party identicator may require cumbersome re-registration. In addition, information such as transaction amounts, seller identities, lists of buyer checking accounts, lists of seller accounts, and/or other transactional information is displayed using a Liquid Crystal Display (LCD) screen, which may be vulnerable to eavesdropping by identity thieves.

Furthermore, users with plural checking accounts must provide manual input to enable the system to determine which account to employ for each transaction. Manually selecting from among plural checking accounts is error prone, especially when users are shopping and lack immediate access to account balances and other information that may be required to select the appropriate account. Requiring additional user input via a keypad at the point-of-sale may further delay shopping lines while users decide which checking accounts to employ for the electronic transactions.

To display the list of available buyer and seller checking accounts via the LCD display, an electronic message is sent from a data processing center or other processor back to the personal identification apparatus. This additional signal transmission, which occurs for each transaction, is time consuming and represents inefficient use of network bandwidth, as this extra messaging may further clutter already congested networks.

Alternatively, to select an account, a user employs the keypad to enter a code, corresponding to a desired account. However, requiring users to remember and enter index codes is relatively user-unfriendly, awkward, error-prone, and slow.

Patents related to U.S. Pat. No. 6,581,042 include the following by Pare, Jr., et al.: U.S. Pat. No. 6,269,348, entitled, TOKENLESS BIOMETRIC ELECTRONIC DEBIT AND CREDIT TRANSACTIONS; U.S. Pat. No. 5,838,812, entitled TOKENLESS BIOMETRIC TRANSACTION AUTHORIZATION SYSTEM; U.S. Pat. No. 5,764,789, entitled TOKENLESS BIOMETRIC ATM ACCESS SYSTEM; U.S. Pat. No. 6,192,142, entitled TOKENLESS BIOMETRIC ELECTRONIC STORED VALUE TRANSACTIONS; and associated parent patents. Generally, these systems suffer from many of the aforementioned shortcomings of U.S. Pat. No. 6,581,042 and may further require use of an additional Personal Identification Number (PIN) that is manually entered via a keypad or other data-entry device. Unfortunately, users often forget pin codes, especially when users have several accounts, each having different codes.

Hence, in addition to requiring that users provide biometric samples, existing biometric transaction systems often require buyers and sellers to manually enter input identification codes and to manually select accounts and to approve or cancel transactions. However, such additional user input may be inconvenient and may delay shopping lines.

Furthermore, existing systems may require excessive additional infrastructure, such as processors, devices, and communication lines. The systems often do not maximize use of existing credit and ATM networks, terminals, machines, and other infrastructure. Furthermore, existing authentication and payment systems, ranging from smart cards to tokenless systems, often lack mechanisms to significantly reduce overall time required to transact business. Consequently, implement.

Hence, a need exists in the art for an efficient system and method that facilitates transactions, such as purchases, while minimizing data entry requirements and reducing overall shopping time and effort. There exists a further need for a system that helps minimize identity theft and that efficiently leverages preexisting infrastructure.

SUMMARY OF THE INVENTION

The need in the art is addressed by systems and methods for facilitating transactions according to embodiments disclosed herein. In an illustrative embodiment, the system is adapted to minimize shopping lines at retail outlets. The system includes a charging terminal capable of charging an account based on an account number. A scanner obtains biometric information, and a first mechanism employs the biometric information to automatically provide an account number to the charging terminal.

In a specific embodiment, the first mechanism includes a credit card or Automated Teller Machine (ATM) terminal, and the account number includes a credit number and expiration date or ATM number and personal identification number. The first mechanism includes a mechanism for automatically selecting from among plural accounts of a given user based on the biometric information. A second mechanism enables a user to control which account number is selected by the first mechanism. The second mechanism includes a third mechanism that enables the user to prioritize plural accounts. The account that is available for automatic charging by the system is the account with the highest priority as determined by the user via the third mechanism.

In the specific embodiment, the second mechanism further includes software that enables a user to trigger automatic selection of an account based on which type of biometric information or combination of biometric information that the user provides. A fourth mechanism provides the transaction information, including the amount of the transaction and/or the type of the transaction, to the first mechanism. A fifth mechanism enables the user to specify selection rules or selection criteria that dictate which account is selected by the first mechanism based on the transaction information.

In a more specific embodiment, the first mechanism includes a sixth mechanism that employs transaction-type information to limit selection of account numbers to only those account numbers that are associated with accounts that are compatible with the transaction type. A database that is remotely accessible to the user allows the user to alter account information and/or selection rules associated with accounts of the user after authentication of the user.

In the illustrative embodiment, the system further includes a seventh mechanism for automatically providing transaction information to the charging terminal. The seventh mechanism includes an eighth mechanism for wirelessly interrogating product tags associated with products to be purchased and computing a total in response thereto and forwarding the total to the charging terminal. The product tags include tag code information pertaining to products associated with the tags. The tag code information is associated with product price. An additional mechanism selectively disables alarm-triggering features of the tags or unlocks the tags in response to one or more signals from the eighth mechanism.

Hence, unlike conventional biometric transaction systems, which may require user input, such as personal identification numbers, account selection input, and input to approve or cancel a transaction, certain embodiments disclosed herein may not require additional acceptance/authorization or input from a user at the point-of-sale other than one or more biometric samples. Furthermore, instead of requiring users to manually select an account from plural accounts for each transaction, account selection may be performed once initially or when the user chooses.

Advantages of certain embodiments disclosed herein are facilitated by the bio scanner and the first mechanism, which enable fraud-resistant automatic retrieval of account information sufficient to enable expedited purchasing. Advantages are further enhanced by the seventh mechanism, which automatically wirelessly obtains product price information from advanced product tags to compute a transaction total. Hence, buyers can now walk into a store, select merchandise; pay for the merchandise via a biometric; and then walk out of the store with the purchased merchandise: all without waiting in line, punching keys on a terminal, or remembering identification codes and account numbers.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be useful.

Figure 1:
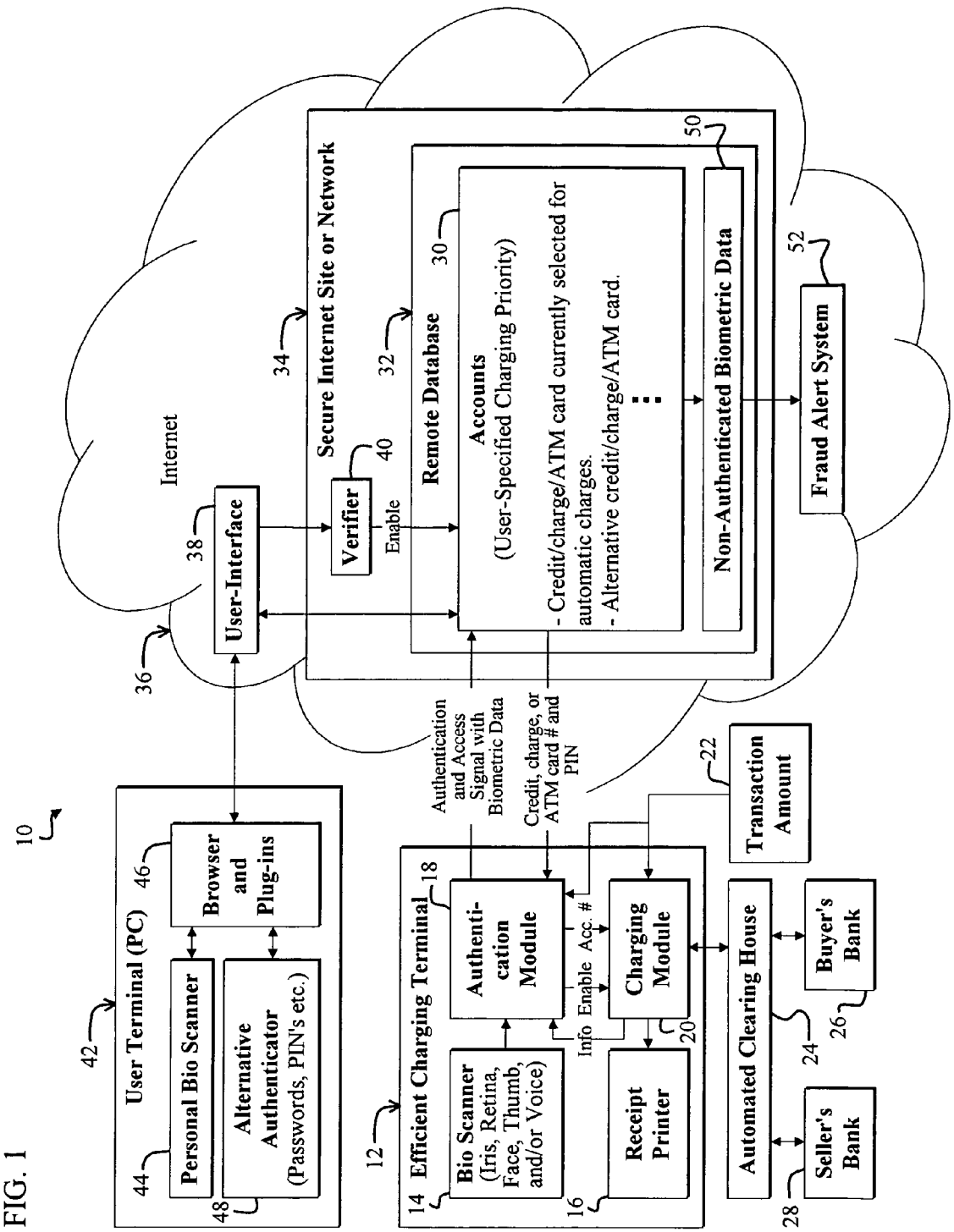
FIG. 1 is a diagram of a system for facilitating payment according to an a first embodiment.

FIG. 1 is a diagram of a system 10 for facilitating payment according to a first embodiment. For clarity, various features, such as power supplies, network routers, computer operating systems, and so on, have been omitted from the figures. However, those skilled in the art with access to the present teachings will know which components and features to implement and how to implement them to meet the needs of a given application.

The system 10 includes an efficient charging terminal 12 having a bio scanner 14, a receipt printer 16, an authentication module 18, and a charging module 20. The efficient charging terminal 12 receives a transaction amount 22 as input to the charging module 20. The charging module 20 communicates with an automated clearing house 24, which can selectively transfer funds between a buyer's bank 26 and a seller's bank 28.

The authentication module 18 receives input from the bio scanner 14 and provides an authentication and access signal with biometric data to a remote database 32 running on a secure Internet site or network 34 on the Internet 36. The authentication module 18 receives credit, charge, or Automated Teller Machine (ATM) and Personal Identification Number (PIN) and/or other requisite account input from the remote database 32. The authentication module 18 selectively provides an enable signal and an account number signal to the charging module 20. The charging module 20 communicates with the receipt printer 16 for printing receipts as needed.

The remote database 32 maintains user account records 30 that are accessible via the authentication module 18 of the efficient charging terminal 12. Account records 30 for a particular user are accessible by that user via a user-interface 38 and a verifier 40. In the present embodiment, the verifier 40 selectively provides an enable signal to the remote database 34 in response to verifiable data from the user-interface 38. The user-interface 38 is user-accessible via the Internet 36. The user-interface 38 is accessible via a browser and appropriate plug-ins 46 running on a user terminal 42, which may be implemented via a personal computer 42. The personal computer 42 may also communicate with a personal bio scanner 44 and/or an alternative authenticator 48 to provide sufficient authentication data for the verifier 40 to verify the authenticity of the user and to generate the enable signal to the remote database 32 in response thereto.

The remote database 32 also stores non-authenticated biometric data in a module 50. The non-authenticated biometric data in the module 50 is received from the verifier 40 and/or the authentication module 18. The non-authenticated biometric data may include any biometric data sent to the remote database 32 that was determined by the database 32 to be non-authentic or not matching any accounts stored on the remote database 32. The non-authenticated biometric data module 50 includes algorithms to alert a fraud alert system 52 when the non-authenticated biometric data satisfies predetermined criteria. The fraud alert system 52 may be triggered, for example, when an authenticated user charges one of the accounts 30 from a certain location, and then another failed attempt to impersonate the authenticated user is made from an entirely different location (such as from a different city or state) shortly thereafter. Hence, the database 32 may automatically verify that no two identical biometric samples are arriving from different physical locations nearly simultaneously, which indicates potential fraud, since a user can only be in one place at one time.

Charge location information may be included with authentication data forwarded to the remote database 32 via the authentication module 18. The charge location information may be coded into the charging terminal 12 upon installation and stored by the authentication module 18 or stored elsewhere on the terminal 12 but accessible to the authentication module 18. The database 32 may further include a reporting system, which may be implemented via the data module 50, that automatically detects fraud attempts and stores a picture of the person attempting fraud in the module 50 to facilitate apprehending and prosecuting those perpetrating fraud. The picture may be provided by a camera (not shown) built into the bio scanner 14.

Unlike many existing systems, such as described in U.S. Pat. No. 5,838,812, Pare, Jr., et al., which apparently rely on an authorized user to alert authorities to potential fraud, the present example embodiment may facilitate automatic fraud notification. Hence, the present embodiment need not rely on user observation or reporting to alert authorities to fraud.

Those skilled in the art will appreciate that while FIG. 1 is discussed with reference to a single efficient charging terminal 12 and a single account holder (user), the system 10 may be scaled to accommodate plural charging terminals and plural account holders as needed.

In operation, a user wishing to make a purchase or otherwise pay the proprietor of the efficient charging terminal 12 provides the transaction amount 22 to the charging module 20. The transaction amount 22 may be automatically provided to the charging module 20 via automatic product tag scanning or and/or other mechanisms as discussed more fully below.

The user then submits to a biometric scan, such as an iris scan, retina scan, face scan, thumb scan, voice scan, and so on, or combination thereof. The biometric scan(s) is/are obtained via the bio scanner 14. The construction of bio scanners, also called biometric scanners, is known in the art. Those skilled in the art will appreciate that the bio scan implemented by the bio scanner 14 may occur before the transaction amount 22 is entered into the charging terminal 12 or vice versa.

In a more specific example embodiment, the bio scanner 12 combines face, iris, and retina scans and forwards a signal containing the composite biometric information to the authentication module 18. Combining plural biometrics may help to minimize attempts to thwart the system 10, such as attempts to thwart the system 10 by providing fake eyeballs.

Combining plural types of scans, such as a facial scan, an iris scan, and a retina scan may further reduce the likelihood of fraud. However, one type of scan alone could be sufficient to reduce fraud over current transaction methods, such as credit cards. Accordingly, a single biometric scan, such as an iris scan, may be employed instead of a composite, without departing from the scope of the present invention.

The authentication module 18 forwards scanned biometric data to the remote database 32. The biometric data acts as a database key to select a database record or other tile containing information about accounts 30 associated with the user that provided the biometric data. Hence, the biometric data received by the remote database 32 from the authentication module 18 may act simultaneously as an account selection signal (also called a database key) and an authentication signal, and in some embodiments, also acts as a charge authorization signal. This is unlike conventional authentication systems, which require separate biometric data comparison steps to authenticate a user before providing access to an account.

In the present embodiment, the user-accounts record 30 contains a list of accounts that is arranged in order of charging priority. For example, the default account to be charged is listed first, followed by a second account (if available) to be charged when the first account is unavailable or otherwise disabled, and so on. Alternatively, only the top-listed account is charged, while subsequent accounts are not charged until the user moves them to the top of the list.

A user may adjust the account list at home via the user terminal 42, which may be implemented via a personal computer having the browser 46 with access to the Internet 36. In the present example embodiment, to adjust the charging priority of accounts 30, the user first provides biometric information via the personal bio scanner 44 and browser 46 to the user-interface 38 on the Internet 36. The user-interface 38 forwards the biometric information to the verifier 40, which compares the biometric information to existing biometric information associated with users of the remote database 32 to authenticate the user. The verifier 40 selectively enables user access to the user accounts 30 via the user-interface 38 in response to verification by the verifier 40. Alternatively, the user employs the alternative authenticator 48, which employs usernames, passwords, or other authentication information to the verifier 40, which authenticates the user and enables access to the account information 30 in response thereto. Note that the store 60 may have one or more user computer terminals located therein, such as the user terminal 42 of FIG. 1, wherein a user can access their financial data and/or the database 32 to make last minute changes to their account priorities before purchasing and without delaying checkout lines.

In the embodiment of FIG. 1, the verifier 40 is shown for illustrative purposes. In a simplified implementation, the verifier 40 is omitted, and the biometric information provided by the user terminal 42 to the remote database 32 via the user-interface 38 acts as an account record selection signal and an account access authorization signal. In this simplified implementation, the need to compare user-supplied biometric information with stored biometric information in a separate step is eliminated. Since false biometric information will not match any accounts at the remote database 32, the user is automatically authenticated when the account record 30 is selected via the user-provided biometric information or other authentication information provided by the alternative authenticator 48.

A user may initially establish an account record 30 in the remote database 32 by providing requisite account information and biometric or other authentication information to the remote database 32 via the user-interface 38. Exact details of the user-interface 38 are application-specific and may be determined by those skilled in the art to meet the needs of a given application without undue experimentation.

The accounts 30 may include lists of various types of accounts, such as credit card accounts, charge card accounts, and bank accounts associated with ATM card numbers and passwords. The remote database 32 may include additional functionality enabling a user to set predetermined rules to determine which of the accounts listed in the accounts record 30 are automatically selected in response to charges initiated by the efficient charging terminal 12.

In one embodiment, the authentication module 18 provides additional account information to the remote database 32 along with the biometric data from the bio scanner 14. The additional transaction information may include transaction amount and transaction type, such as credit card transaction or check transaction. The transaction type may be determined by the capabilities of the charging module 20. For example, if the charging module 20 is a conventional credit card terminal 20, the authentication module 18 may be configured to indicate to the remote database 32 that the transaction is a credit card transaction.

A user may then control account selection parameters based on the additional account information. In the present embodiment, software implemented via the remote database 32 or otherwise running on the secure Internet site or network 34 enables a user to set account-selection preferences in accordance with transaction type and transaction amount. For example, a user may specify that transactions greater that a certain dollar amount be charged to a certain credit card with a larger limit to accommodate the larger transactions, while smaller transactions should be charged to an account with a lower interest rate but a lower limit. As another example, the user might also specify that no accounts be charged if the transaction type is credit card only, and the user has specified an ATM card number and PIN as the default account to be charged. In this case, the remote database 32 would not return a number or combination of numbers corresponding to accounts to be charged to the authentication module 18.

Furthermore, in the present example embodiment, if the user has no accounts that match the transaction type, then the remote database 32 will not provide sufficient charging information to the efficient charging terminal 12. Hence, the remote database 32 may employ transaction-type information to limit selection of account numbers to only those account numbers that are associated with accounts that are compatible with the transaction type.

Additional user account selection options may be provided by incorporating transaction location information in the signal forwarded from the authentication module 18 to the remote database 32. A user may then specify that charges from a particular store be placed on one credit card, while charges from another store or regional location be placed on another card.

Providing user options to configure automatic account selection rules based on predetermined criteria while at home and via their personal computer 42 reduces user input that must be provided at the point-of-sale, resulting in reduced lines and improved purchasing efficiency. Furthermore, at remote locations, such at home, users are more likely to have reliable access to their existing account information such as via the Internet 36. Accordingly, users may make more informed decisions about which accounts are selected for a given transaction. Requiring users to select accounts at the point-of-sale is problematic, error-prone, and may delay shopping lines.

The additional transaction-type information forwarded to the remote database 32 via the authentication module 18 enables the remote database 32 to provide the user with plural options to control which account is automatically selected for a particular transaction initiated by the efficient charging terminal 12. Those skilled in the art will appreciate that requisite functionality of the remote database 32 may be readily developed by one skilled in the art with access to the present teachings without undue experimentation.

Furthermore, the remote database 32 may incorporate software to enable a user to automatically select an account based on which type biometric sample or combination of samples that they wish to present. For example, an iris scan may be linked to one account, while a thumb print scan may be linked to another account, while the combination of a thumb scan and an iris scan may be associated with yet another account.

In the present embodiment, in response to the signal from the authentication module 18, the remote database 34 automatically provides account information pertaining to the account to be charged to the authentication module 18. In the case of a credit card transaction, this includes credit card numbers and expiration dates. In the case of an ATM transaction, this includes ATM account numbers and PIN's. In the case of a checking transaction, this includes an appropriate check number, etc. The authentication module 18 relays the charging information to the charging module 20. Hence, the system 10 can accommodate plural types of accounts simultaneously.

The charging module 20 may be implemented via a conventional credit card charging terminal or other charging terminal, such as a check-charging terminal or a terminal with plural transaction-type capabilities. A conventional terminal may be readily adapted to receive charging information electronically rather than manually by those skilled in the art and without undue experimentation.

Unlike conventional biometric transaction systems, which often require significant additional infrastructure and do not efficiently employ/leverage existing credit and ATM networks, terminals, and machines, embodiments of the present invention may efficiently use preexisting infrastructure, such as credit card charging terminals and networks. Existing charging machines can be efficiently adapted to accept either conventional token-based payment or automatic bio scan payment via the biometric transaction system 10. Furthermore, communications links between the database 32 and the charging terminal 12 may be implemented via preexisting infrastructure, such as the Internet 36.

If the authentication module 18 determines that received charging information from the remote database 32 is insufficient to implement a charge via the charging module 20, that the charging module 20 is not thereby enabled for biometric transactions, but may be enabled for conventional token-based transactions. Otherwise, the charging module 20 is enabled for biometric transactions, and the requisite account information is provided to the charging module 20.

The charging module 20 may the initiate a charge, such as via an automated clearing house 24, which selectively transfers funds corresponding to the transaction amount and any additional fees from the buyer's bank 26 to the seller's bank 28. The charging module 20 may then initiate printing of a receipt via the receipt printer 16. In the present embodiment, the seller is the proprietor of the efficient charging terminal 12.

In the present embodiment, all communications links, such as between the efficient charging terminal 12 and the secure Internet site or network 34 are encrypted, such as via spread-spectrum encryption techniques. Encrypting messages helps to thwart signal interception attempts. Systems and methods for encrypting signals are known in the art and may be readily adapted for use with the system 10 by those of ordinary skill in the art. Various other well-known security systems and methods may also be employed to ensure that the database 32 is not fraudulently accessed, such as via a mock charging terminal or other system (not shown).

Unlike many existing biometric transaction systems, the biometric transaction system 10 does not require authentication of the payee, i.e., the seller or the proprietor of the efficient charging terminal 12. However, the embodiment 10 of FIG. 1 does not preclude implementing payee or seller authentication methods. Accordingly, the biometric transaction system 10 enables omission of a critical element of many existing systems, without loss of functionality. Payees are no longer required to submit to potentially time-consuming additional registration or to obtain digital certificates or submit to other tedious authentication, measures beyond those already implemented via conventional charging systems, such as credit card charging systems.

Furthermore, the biometric transaction, system 10 obviates the need for the payee to register with the database 32 by providing hardware codes, phone numbers, and so on. Instead, electronic transactions, including electronic checking transactions, may be implemented directly through existing credit card/ATM network functionality.

Furthermore, conventional systems typically do not allow a user to prioritize accounts at the database. Instead, conventionally, a user must manually select accounts at the point-of-sale, which contributes to lines and may increase incidences of fraud.

In addition, unlike many existing biometric transaction systems, manual entering of PIN's or punching codes in a keypad is not required. User transaction authorization is implied when the user submits to a bio scan. However, the system 10 may include basic functionality that enables a user to cancel a transaction, as this functionality is typically already available though existing charging modules which may be employed to implement the charging module 20 of the efficient charging terminal 12. Unlike existing systems, use of additional manually entered PIN codes and associated data input devices are unnecessary, as all requisite identification data is efficiently scanned or automatically transferred from the remote database 32 as needed. However, the present invention does not preclude use of manually entered pin codes and additional data input devices.

Figure 2:
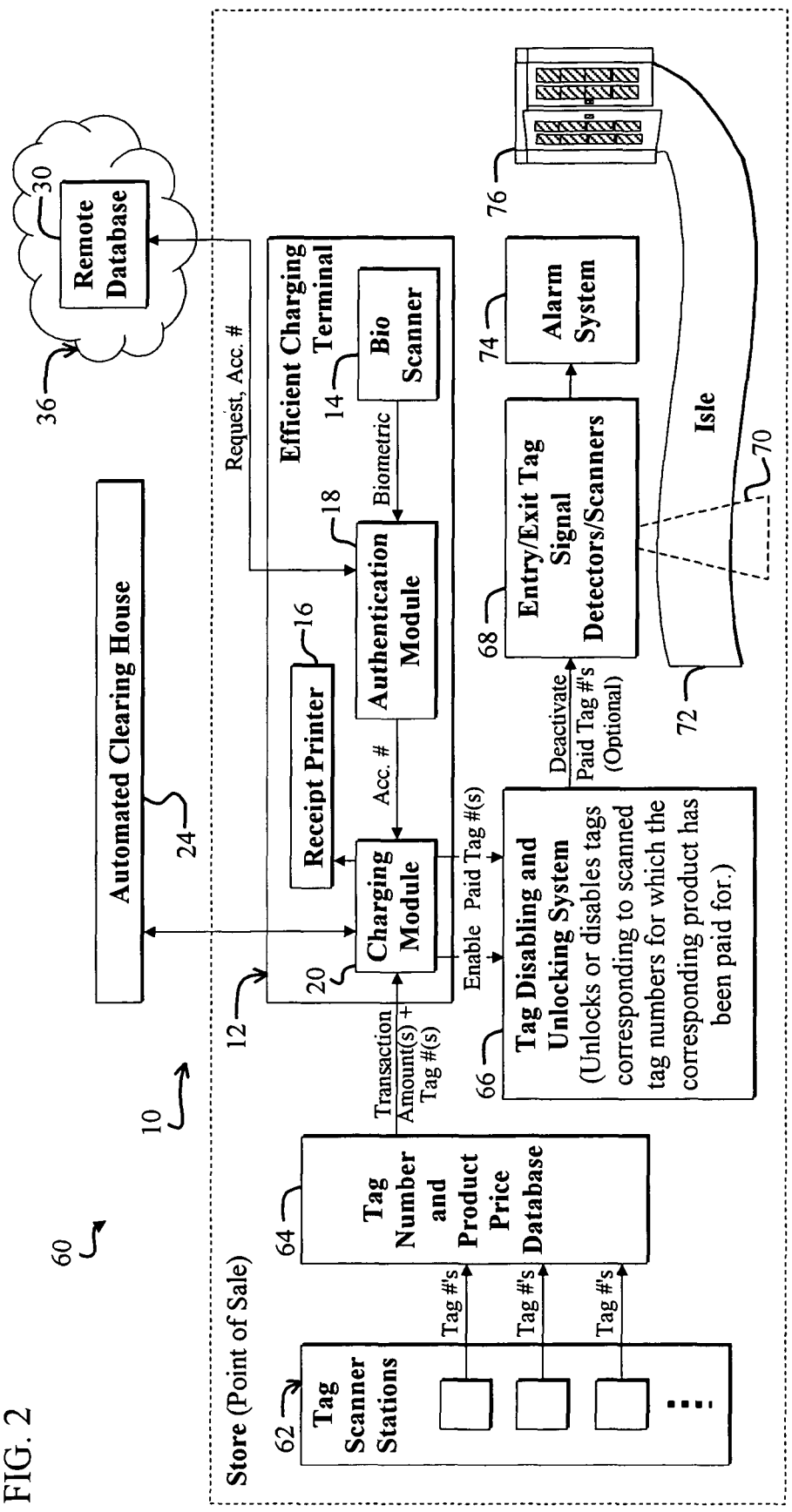
FIG. 2 is a diagram of a store employing the system of FIG. 1 and additional components for minimizing shopping lines.

FIG. 2 is a diagram of a store 60 employing the system 10 of FIG. 1 and additional components 62-76 for minimizing checkout lines and shopping time. The charging module 20 of the system 10 is configured to receive transaction amount input from a tag number and product price database 64, which receives tag numbers (tag codes) from various tag scanner stations 62. The charging module 20 is also configured to provide an enable signal and tag numbers corresponding to product(s) that have been paid for via the biometric transaction system 10 to a tag disabling and unlocking system 66. The tag disabling and unlocking system 16 optionally forwards the tag numbers associated with products) that have been paid for to an entry/exit tag signal detector/scanner 68 that is positioned adjacent to an isle 72 leading to an exit 76. The entry/exit tag signal detector/scanner 68 communicates with an alarm system 74 and scans all tags entering a scanning region 70 over the isle 72.

In operation, a user shops in the store 60 by collecting merchandise in a bag or basket (not shown). Each item of merchandise has a special tag locked thereto, embedded therein, or otherwise attached thereto. Each tag has a number and a status associated therewith. The status indicates whether the tag is disabled or enabled and/or unlocked or locked. In the present example embodiment, each tag includes a mechanism, such as a transceiver in communication with a memory device, microprocessor, and accompanying software that comprise a module(s) that communicates with a lock. The transceiver and module(s), as discussed more fully below, enable the status of the tag to be wirelessly interrogated and set by the tag disabling and unlocking system 66. Similarly, the tag disabling and unlocking system 66 includes a mechanism, such as a transceiver and a tag-status-setting module, that enables the system 66 to wirelessly determine the status of each product tag and to set the status of the tag. As discussed more fully below, the status of the tag may be set by locking or unlocking the tag or by disabling alarm-triggering functionality built into the tag.

In an exemplary scenario, a user approaches the biometric transaction system 10 and accompanying scanning station 62 with a bag of tagged merchandise that the user wishes to purchase. When the user and accompanying products are positioned within a predetermined region about one of the tag scanner stations 62, the tags are automatically wirelessly scanned. In the present example, each of the tag scanner stations 62 include requisite transceivers required to wirelessly interrogate the product tags to extract tag number and/or price information, as discussed more fully below. If product price information is not available by direct scan of the tag, the tag number and product price database 64 is referenced to determine the price of a product associated with a given tag number. Tag numbers and prices of associated products are maintained via the database 64.

Tag numbers and associated product prices and a total price for all of the products scanned are then forwarded to the charging module 20 of the biometric transaction system 10. The user then submits to a bio scan via the bio scanner 14, which measures certain biological characteristics of the user, such as unique iris pattern and retina pattern. The biometric transaction system 10 then automatically accesses the remote database 30 to retrieve requisite numbers, such as credit card number and expiration data, to charge a user account, such as a credit card account. The charging module 20 then automatically charges the account. Those skilled in the art will appreciate that transaction systems other than biometric transaction systems may be adapted for use with the store 60 of FIG. 2 without departing from the scope of the present invention.

In one embodiment, to cancel a transaction, a user simply scans a portion of the tag that includes an order cancellation code (not shown) embedded therewith. Alternatively, in the event that a user changes their mind, a button (not shown) may be pressed on the bio scanner 14 or other connected device to cancel the last transaction or to negate transactions associated with certain product codes. Alternatively, existing charge cancellation functionality built into the charging module 20, which may be a conventional credit card, bank card, charge card, check card, and/or ATM terminal, may be employed to selectively cancel transactions.

When the selected products are paid for, the charging module 20 provides an enable signal and corresponding tag numbers to the tag disabling and unlocking system 66. The user, who submitted to the bio scan via the bio scanner 14, is in proximity to the tag disabling and unlocking system 66, which automatically wirelessly disables and/or unlocks the tags associated with the products that have been paid for.

In implementations wherein the tags are unlocked, the user may remove the unlocked tags from the products and return them to the store 60. The store 60 may credit consumers for each returned tag or otherwise provide incentives to return the tags. In implementations wherein the tags are disabled, the user may walk out the exit 76 with the paid for products and accompanying tags without triggering the alarm system 74. The user may later throw the tags away. Alternatively, tag and product manufactures may build the tags into the products. A user may also obtain a receipt from the receipt printer 16, which may be checked by a guard (not shown) stationed at the exit 76 as users depart to ensure that the user has paid for all products that the user possesses.

In an alternative implementation, functionality implemented via the tag scanner stations 62, tag number and product price database 64, and the tag disabling and unlocking system 66 are combined into a single module, as discussed more fully below. The resulting module can scan tags to determine the price of the products being purchased and can selectively disable tags associated with products that have been purchased.

Those skilled in the art will appreciate that the tag disabling and unlocking system 66 may be implemented as a tag-disabling system only or a tag-unlocking system only without departing from the scope of the present teachings. Furthermore, the tag disabling and unlocking system 66 may be omitted without departing from the scope of the present teachings.

Buyers can now walk into the store 60, select merchandise; pay for the merchandise by looking into the bio scanner 14; and then walk out the store 60 with the purchased merchandise; all without waiting in line, punching keys on a terminal, or remembering identification codes and account numbers. The tags in a user shopping bag can be interrogated and automatically disabled without requiring the user to remove the products from the shopping cart or shopping bag.

In yet another implementation, the tags associated with the products to be purchased are implemented via Uniform Code Council (UCC) symbols. In this case, buyers manually scan UPC codes via the scanner stations 62. The tag number and product price database 64 then computes a total price for all products scanned by the buyer. This total price is forwarded to the biometric transaction system 10 in preparation for a purchasing transaction. In this example implementation, a receipt from the receipt printer 16 and a guard at the exit 76 are employed to reduce theft, and the modules 66, 68, and 74 are omitted.

Those skilled in the art will appreciate that the biometric transaction system 10 may also be employed for online purchases and not just for physical store purchases. The personal bio scanner 44 of FIG. 1, which may be implemented as a simple iris/retina/facial scanner etc., may be employed to automatically authorize online transactions.

Figure 3:
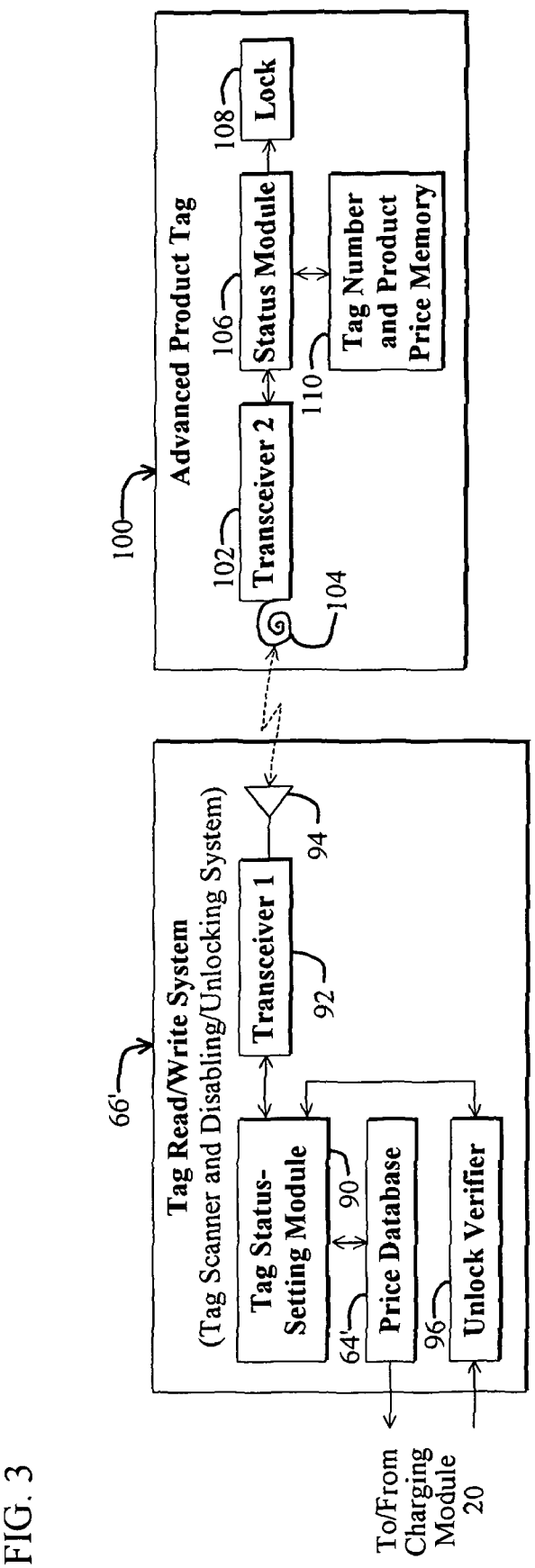
FIG. 3 is diagram illustrating an exemplary embodiment of a tag read/write system and an advanced radio-controlled tag adapted for use with the store of FIG. 2.

FIG. 3 is diagram illustrating an exemplary embodiment a tag read/write system 66' and an advanced radio-controlled tag 100 that are adapted for use with the store of FIG. 2. In the present embodiment the tag read/write system 66' incorporates functionality implemented by the tag scanner stations 62, and the tag number and product price database 64 of FIG. 2. The tag read/write system 66' includes a tag status-setting module 90 in communication with a first transceiver 92 having an antenna 94. The tag status-setting module 90 communicates with an unlock verifier module 96 and a price database 64', which provides transaction price input to the charging module 20 of FIG. 2. The unlock-verifier 96 receives enabling input from charging module 20 of FIG. 2.

The advanced product tag 100 includes a second transceiver 102 having a tag antenna 104, which facilitates wireless communications with the first transceiver 92 and accompanying antenna 94 of the tag read/write system 66'. The second transceiver 102 communicates with a tag status module 106, which provides input to a lock 108 and also communicates with a tag number and product price memory 110.

In operation, with reference to FIGS. 2 and 3, a user wishing to purchase one or more products stands with their products (which may be in a bag, cart, or other container, or carried) in proximity to the tag read/write system 66' within range of the first wireless transceiver 92. Each product has an advanced tag 100 affixed or locked thereto. The transceiver 92, which broadcasts an electric and/or magnetic field detects the presence of the advanced product tag 100, which may be powered by the electric and/or magnetic field broadcast by the first transceiver 92 and antenna 94.

In the present example embodiment, when the advanced product tag 100 is positioned within range of the first transceiver 92, the coil antenna 104 associated with the tag transceiver 102 converts the wireless energy from the first transceiver 92 into an electrical signal that powers the modules 102-110 of the advanced product tag 100. The tag 100 then transmits a connection signal upon connecting with the tag read/write system transceiver 92. The connection signal may include that status of the tag 100, such as whether the tag 100 is locked or unlocked as indicated by the status module 106 The connection signal may also include the unique product tag code or number and associated product price as maintained in the tag number and product price memory 110. The connection signal confirms to the tag status-setting module 90 that the particular tag has been detected by the read/write system 66'.

The tag number and product price memory 110 and the status of the lock 108 of each advanced product tag 100 may be preset for each product. Tag status setting may be implemented via a user-interface (not shown) to the tag status-setting module 90 of the tag read/write system 66'.

Those skilled in the art will appreciate that the lock 108 may be omitted without departing from the scope of the present invention. For example, instead, the status module 106 may maintain an enabled or disabled tag status. Tags associated with products that have been purchased are assigned disabled status, while tags associated with products that have not been purchased are assigned enabled status. Enabled tags may trigger exit alarm systems, such as the system 74 of FIG. 2.

The tag status-setting module 90 retrieves tag and associated product price information from the advanced product tag 100. Alternatively, only the tag number is retrieved from the advanced product tag 100. In this case, the price of the product associated with that tag number is retrieved by the tag status-setting module 90 from the product price database 64' in response to a tag code forwarded from the tag status-setting module 90 to the price database 64'. The price database 64' may compute a total price for all tags detected by the tag read/write system or may forward each price to the charging module 20 of FIG. 2, which then totals the prices for a given transaction. Alternatively, the total transaction price is forwarded from the price database 64' to the charging module 20.

With reference to FIGS. 2 and 3, after the charging module 20 successfully bills a buyer for purchased product(s), an enable signal is sent to the unlock verifier 96, which sets and checks the status of the lock 108 of the advanced tag 100 by interrogating the tag status module 106 via the tag status-setting module 90, the first transceiver 92, and the second transceiver 102. If the tag 100 is locked, the unlock verifier 96 triggers unlocking of the tag 100 and forwards a signal to the status module 106 sufficient to change the status of the advanced product tag 100.

If a tag 100 is locked, and the product associated with the tag 100 has not been purchased, the status module 106 indicates that the tag is enabled or locked. Accordingly, if the user attempts to pass the alarm system 74 adjacent to the exit 76, then the alarm will sound.

The advanced product tag 100 may be implemented via smart label technology, such as Radio Frequency Identification (RFID) tag technology. RFID technology may include so-called inductive coupling, wherein the antenna 104 is implemented via a metal coil, and capacitive coupling, wherein the antenna 104 is implemented via conductive carbon ink.

An RFID tag transmits signals to a reader, such as the tag disabling and unlocking system 66 of FIG. 2 or the tag read/write system 66' of FIG. 3. The reader can read the tags, such as the tag 100, when the tags are positioned within predetermined distance from the tag read/ rite system 66'. The predetermined distance is a function of the size of the antenna coil 104 and the range of the electromagnetic field transmitted by the transceiver 92.

Generally, the tags 100 will include a microprocessor (not shown) to enhance tag functionality and to implement the status module 106 and tag number and price module 110 of the tag 100. The tag number and product price memory 110 may be implemented via a Product Markup Language (PML) file and accompanying microprocessor memory hardware. PML, which is related to eXtensible Markup Language (XML), is known in the art. The tag lock 108 may be selectively triggered via algorithms running on the status module 106, which may include a microprocessor.

Inductively-coupled RFID tags may be powered by the magnetic field generated by the reader 62, 66. The tag antenna 104 converts the electromagnetic energy contained in the magnetic field into electrical current sufficient for tag operation.

Tags implemented via capacitive coupling RFID technology, which technology are becoming more cost-effective. In one embodiment, the tags 100 are implemented via capacitive coupling RFID technology, wherein the antenna 104 is implemented via carbon ink strategically deposited on paper. A microprocessor and accompanying memory module (not shown) in communication with the antenna 104 may be employed by one skilled in the art to implement the tags 100 without undue experimentation. As tag technology advances and microprocessor prices drop, costs to manufacture the tags 100 will drop accordingly, thereby facilitating implementation of certain embodiments disclosed herein.

Thus, the present invention has been described herein with reference to embodiment for a particular application particular embodiments for particular applications Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for facilitating transactions comprising:
a charging terminal for charging an account based on an account number;
a scanner for obtaining biometric information; and
first means for employing said biometric information to provide said account number to said charging terminal, wherein said charging terminal is adapted to initiate charging said account via preexisting infrastructure in response to being provided said account number by said first means, and wherein said first means includes a database that is located remotely from said charging terminal, wherein said database does not require communication with preexisting banking infrastructure.

2. The system of claim 1 wherein said charging terminal includes a credit card or Automated Teller Machine (ATM) terminal, and wherein said account number includes a credit number and a corresponding expiration date or an ATM number and a corresponding Personal Identification Number (PIN).

3. The system of claim 1 wherein said database includes a user-modifiable database for automatically selecting, based on said biometric information, an account from among plural accounts of said user, wherein said user-modifiable database includes one or more records or data that are modifiable directly by a user of said system.

4. The system of claim 3 further including second means for enabling a user to control which account number is selected by said first means.

5. The system of claim 4 wherein said second means includes said user-modifiable database, which is adapted to enable a user to prioritize plural accounts, an available account with the highest priority being automatically selected by said first means.

6. The system of claim 4 wherein said user-modifiable database includes software that enables a user to trigger automatic selection of an account based on biometric information that said user provides.

7. The system of claim 4 wherein said system further includes third means for providing transaction information, including amount of said transaction and/or type of said transaction, to said user-modifiable database.

8. The system of claim 7 wherein said user-modifiable database is adapted to enable a user to change selection rules or selection criteria, wherein said selection rules or selection criteria dictate which account is selected by said first means.

9. The system of claim 7 wherein said user-modifiable database includes means for employing transaction-type information to limit selection of account numbers to only those account numbers that are associated with accounts that are compatible with said transaction type.

10. The system of claim 4 wherein said user-modifiable database is remotely accessible, via the Internet, to a user, wherein said user-modifiable database is in communication with means for authenticating said user before allowing said user to alter selection rules associated with accounts of said user.

11. The system of claim 1 wherein said system further includes fourth means for automatically providing transaction information to said charging terminal.

12. The system of claim 11 wherein said fourth means includes fifth means for wirelessly interrogating product tags associated with products to be purchased and computing a total in response thereto and forwarding said total to said charging terminal.

13. The system of claim 12 wherein said product tags include tag code information pertaining to products associated with said tags, said tag code information associated with product price.

14. The system of claim 13 further including means for selectively disabling anti-theft features of said tags in response to one or more signals from said fourth means.

15. A system for facilitating a financial transaction comprising:
first means for measuring one or more biological characteristics of a user;
a database that is modifiable by a user of said system, wherein said database is adapted to select an account associated with said user based on said one or more biological characteristics and is adapted to provide a transaction signal in response thereto, and wherein said database is positioned remotely from said first means; and second means for facilitating implementing a funds transfer to or from said selected account in response to said transaction signal.

16. The system of claim 15 wherein said first means is in communication with said database and includes means for providing a first signal to said database based on said one or more biological characteristics, said first signal acting as an authorization signal, an authentication signal, and an account-selection signal, said database providing said transaction signal to said second means based on said first signal, and wherein said database does not require participation of a clearing house.

17. The system of claim 16 wherein said database is adapted to selectively output account information to a charging terminal of said second means via said transaction signal in response to said first signal.

18. The system of claim 17 further including means for enabling a user to predetermine account selection rules for accounts listed in said database, said selection rules determining which account is selected via said database.

19. The system of claim 18 wherein said means for enabling further includes a terminal or computing device adapted to enable a user to modify information in said database at a position that is remote from a point of sale associated with said financial transaction.

20. The system of claim 15 wherein said database includes an account list, said account list being user-editable, thereby enabling a user to selectively control which account is automatically selected by said database in response to said first signal provided to said database via said first means for measuring one or more biological characteristics of said user.

21. The system of claim 20 further including means for identifying a user before enabling said user to access or configure information that is stored via said database and that is associated with said user.

22. The system of claim 21 wherein said database includes means for employing said first signal to authenticate said user before providing said transaction signal to said second means, wherein said second means is adapted to initiate a charge upon or after receipt of said transaction signal.

23. The system of claim 22 further including means for storing information pertaining to said one or more biological characteristics of a user when said means for employing fails to authenticate said user.

24. The system of claim 15 wherein said second means includes a credit card, charge card, and/or Automated Teller Machine (ATM) charging module, and wherein said transaction signal includes a selected credit card, charge card, or ATM card number associated with said user, and wherein said database operates independently of a clearing house or bank and is located remotely therefrom.

25. A method comprising:
obtaining biometric information;
using said biometric information to retrieve, from a database, account information associated with said biometric information, and providing retrieved account information in response thereto, wherein said database operates independently of a clearing house or banking infrastructure; and
employing said retrieved account information to initiate a charge via a charging terminal, wherein said database is located remotely from said charging terminal.

26. The method of claim 25 wherein said step of employing includes further employing preexisting infrastructure to facilitate charging an account based on said account information, said preexisting infrastructure including a clearing house.

27. The method of claim 25 wherein said database is remotely positioned from, and does not communicate directly with, a clearing house.

28. The method of claim 25 wherein said database is independent of a clearing house or a bank that is associated with said account information such that operation of said database occurs independently of operation of said clearing house or bank.

29. The method of claim 25 wherein said database is user accessible for enabling an account holder to edit said account information.

30. The method of claim 25 wherein said step of employing includes automatically inputting said retrieved account information into said charging terminal for subsequently initiating a charge via said charging terminal based on said retrieved account information.

31. A system for facilitating transactions comprising:
a charging terminal adapted to charge an account based on user account information;
a user-modifiable database containing user account information, wherein said user-modifiable database is positioned remotely from said charging terminal; and
a scanner module adapted to employ scanned biometric information to deliver user account information from said user-modifiable database to said charging terminal.

* * * * *